Nov. 28, 1961  E. DOUCHET  3,010,866
METHOD AND APPARATUS FOR PRODUCING PLASTIC SHEET
MATERIAL ASSEMBLIES WITH DECORATIVE
SIMULATED STITCHING THEREON
Filed May 21, 1958  2 Sheets-Sheet 1

INVENTOR.
EUGENE DOUCHET
BY
ATTORNEY.

INVENTOR.
EUGENE DOUCHET
BY
ATTORNEY.

United States Patent Office 3,010,866
Patented Nov. 28, 1961

3,010,866
METHOD AND APPARATUS FOR PRODUCING PLASTIC SHEET MATERIAL ASSEMBLIES WITH DECORATIVE SIMULATED STITCHING THEREON
Eugene Douchet, Sarcelles, France, assignor of one-half to Societe JOP and one-half to Etablissements Taulet & Cie, Sarcelles, France, both corporations of France
Filed May 21, 1958, Ser. No. 736,723
Claims priority, application France Oct. 6, 1954
14 Claims. (Cl. 156—219)

This application is a continuation-in-part of my co-pending applications for United States Letters Patent Serial No. 516,889, filed June 21, 1955, now abandoned, and Serial No. 551,839, filed December 8, 1955, now Patent No. 2,948,648.

This invention relates generally to a method and apparatus for producing plastic sheet material assemblies useful in the production of upholstered seats or panels, morocco articles and the like, and more particularly is directed to a method and apparatus for producing assemblies of the described character wherein at least one elongated element is bonded to the outer surface of a sheet or sheets of plastic material to simulate stitching on, or otherwise decorate, such outer surface.

Frequently, in plastic sheet material assemblies of the described character, a padding or stuffing of plastic material is interposed between two sheets of plastic material with the two sheets being bonded together through the padding or stuffing along at least one line, and it is an object of the invention to bond the decorative or stitched simulating element to the surface of the outer sheet along the same line simultaneously with the bonding together of the stuffing and the two sheets.

When thermoplastic materials are employed for the sheet or sheets and for the decorative or stitched simulating elongated element of assemblies of the described character, and heat is employed for effecting the necessary bonding, it is important that the excessive softening of the elongated element be avoided for, otherwise, the elongated element is mutilated and can no longer properly function to decorate or simulate stitching on the exposed surface of the assembly. Accordingly, it is another object of the invention to provide a method and apparatus for simultaneously bonding together the sheets of thermoplastic material and bonding the elongated decorative or stitched simulating thermoplastic element to the outer surface of the sheets without excessive softening or mutilation of the elongated element.

In accordance with an aspect of the invention, the simultaneous bonding of the sheets of thermoplastic material to each other and of the elongated thermoplastic element to the outer surface of the sheets is effected by dielectric heating, that is, by producing a high frequency, electrostatic field in which the dielectric sheets and elongated elements are interposed, and wherein the conditions of such dielectric heating are controlled so that the elongated element is softened only to a relatively slight extent while the adjacent portions of the sheets are softened sufficiently to produce the desired bond.

In one embodiment of the present invention, an apparatus for producing thermoplastic sheet material assemblies of the described character includes a fixed electrode forming a support platen or table on which the sheet or sheets of thermoplastic material may be laid, a generator emitting a high frequency alternating current having one terminal connected to the fixed electrode, and a vertically movable electrode assembly disposed above the platen or table and connected to the other terminal of the generator, with such vertically movable electrode assembly having a vertically actuated support plate and at least one side plate carried by the support plate and capable of vertical movement relative to the latter, the side plate being yieldably urged to a position where its lower edge projects downwardly beyond the lower edge of the support plate, so that, when the support plate is moved downwardly toward the table or platen with an elongated decorative or stitched simulating element disposed under the support plate, the lower edge of the side plate first presses the sheet material against the table or platen while the alternating electrostatic field serves to agitate the molecules of the sheet material for heating and softening the latter along the line of the lower edge of the side plate, and thereafter the support plate arrives at a downwardly limited position where it holds the elongated element against the previously softened sheet material to cause bonding to the latter while avoiding excessive heating or pressing of the elongated element and consequent mutilation of the latter.

In another embodiment of the invention, the vertically movable electrode is in the form of a vertically disposed plate having a downwardly opening, centrally located longitudinal groove in the lower edge surface thereof to accommodate the elongated decorative or stitched simulating thermoplastic element, while the portions of the lower edge of the movable electrode plate at the opposite sides of such groove are adapted to contact and press the sheet material at the opposite sides of the elongated element applied to the outer surface of the sheet material. Since the intensity of the dielectric heating is dependent upon the distance between the electrodes, and since the top of the downwardly opening groove accommodating the elongated thermoplastic element is disposed a further distance from the flat platen forming the fixed electrode than are the portions of the lower edge of the movable electrode plate at the opposite sides of the groove, it will be apparent that the portions or areas of the thermoplastic sheets engaged by such portions of the lower edge of the movable electrode plate at opposite sides of the groove will be more intensely heated and softened than is the elongated element, whereby an effective bond can be achieved without excessive heating or mutilation of the elongated stitched simulating element.

The above, and other objects, features and advantages of the invention will be apparent in the following detailed description of illustrative embodiments thereof which is to be read in connection with the accompanying drawings forming a part hereof, and wherein.

Figure 1:
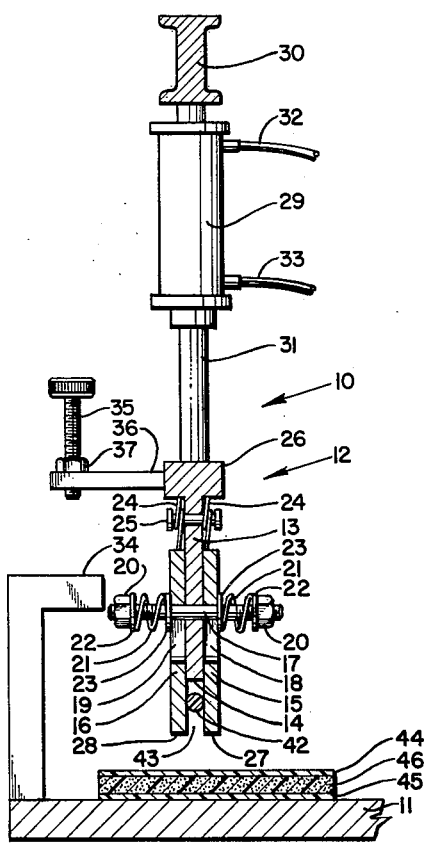
FIG. 1 is a vertical sectional view of an apparatus constructed in accordance with a first embodiment of the present invention.

Referring to the drawings in detail, and initially to FIG. 1 thereof, it will be seen that an apparatus embodying the present invention, and there generally identified by the reference numeral 10, includes a suitably supported table 11 and at least one electrode assembly 12 which is vertically movable, as a unit, above the table 11.

The electrode assembly 12 (FIGS. 1 and 2) includes a main or support plate 13 extending across the table 11 in a vertical plane with its lower edge 14 extending horizontally, and side plates 15 and 16 carried by the support plate 13 at the opposite sides of the latter and mounted for vertical movement relative to the support plate. Such vertical movement of the side plates 15 and 16 relative to the support plate 13 therebetween may be provided by a mounting for the side plates that includes a bolt 17 extending laterally through the central support plate 13 at each of several locations spaced along the latter and passing loosely through vertically elongated slots 18 and 19 in the side plates 15 and 16, respectively. Nuts 20 are threaded on the opposite ends of the bolt 17 and helical compression springs 21 extend around the bolt 17 and abut, at their opposite ends, against washers 22 and 23 which are arranged under the adjacent nut 20 and against the outer surface of the related side plate 15 or 16. Thus, the springs 21 hold the side plates 15 and 16 laterally against the central support plate 13, while the side plates are free to move vertically with respect to the support plate to the extent permitted by the vertically elongated slots 18 and 19 thereof.

The side plates 15 and 16 are yieldably urged in the downward direction relative to the central support plate 13, for example, by springs 24 which are mounted on pins 25 carried by the support plate and which have their opposite ends abutting against the upper edges of the side plates and the underside of a laterally enlarged portion 26 along the top edge of the support plate, so that, normally, the lower edges 27 and 28 of the side plates 15 and 16 extend downwardly substantial distances below the lower edge 14 of the support plate.

The necessary vertical movements of the electrode assembly 12, as a unit, can be effected, as shown in FIG. 1, by one or more pressure fluid operated, double-acting cylinders 29 which are mounted vertically on a frame 30 and have their reciprocable rams 31 suitably connected to the top portion 26 of the central support plate 13, so that the related electrode assembly 12 is moved downwardly toward the table 11, when pressure fluid is supplied to the upper end of each related cylinder 29, as through a conduit 32, and the electrode assembly is elevated, for example, to the position shown in FIG. 1, when pressure fluid is supplied through a conduit 33 to the lower end of each related cylinder 29.

The apparatus 10 further is provided with means for limiting the downward movement of the central support plate 13 of electrode assembly 12 relative to the table 11, and such means may include a fixed abutment 34 extending from the table into the path of downward travel of a stop bolt 35 which is adjustably threaded through a bracket 36 on the support plate 13 and provided with a lock nut 37 for holding the bolt 35 against inadvertent movement relative to the support plate. It is apparent that the engagement of the lower end of bolt 35 with the abutment 34 will determine the limit of the permitted downward travel of support plate 13 toward table 11, and that such limit of the downward travel can be conveniently adjusted by rotation of the bolt 35.

Figure 3:
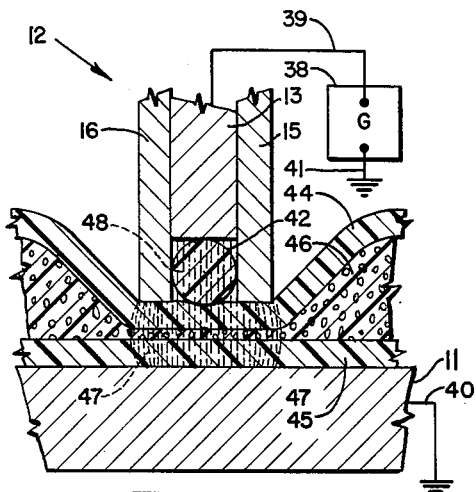
FIG. 3 is an enlarged, fragmentary sectional view illustrating the operation of the apparatus of FIGS. 1 and 2.

As seen in FIG. 3, the electrode assembly 12, as a unit, may be connected to one terminal of a generator or other source 38 of high-frequency alternating electric current, as by a conductor 39, while the table 11 is connected to the other terminal of the generator 38, for example, by grounding both the table and the other generator terminal, as at 40 and 41, respectively. With the electrical connections illustrated in FIG. 3, the support plate 13, as well as the side plates 15 and 16, may be formed of conductive material and the central support plate 13 may form an electrical contact between the side plates 15 and 16.

The apparatus 10, which has been described above with reference to FIGS. 1, 2 and 3, operates as follows:

With the electrode assembly 12 in its elevated position (FIG. 1), an elongated element 42 of exclusively dielectric material, preferably of a thermoplastic material, is suitably extended longitudinally through the space 43 between the side plates 15 and 16 below the lower edge 14 of the support plate, and the thermoplastic sheet material to which the element 42 is to be bonded for decoration or for simulating stitching is placed upon the table 11. As seen in FIG. 1, such sheet material may include upper and lower sheets 44 and 45 of thermoplastic material and a layer 46 of spongy padding or filling therebetween which is also thermoplastic.

When the electrode assembly 12 is moved downwardly, the lower edges 27 and 28 of the side plates, which are normally projected substantial distances below the lower edge 14 of the central plate, first come into contact with the top layer or sheet 44 along two parallel lines defining the lateral margins of a bonding zone or area and then apply downward pressure to the assembly of the sheets 44 and 45 and the layer 46 to compress the assembly in the bonding area, as shown in FIG. 3. As downward movement of the ram 31 continues, the resistance to further compression of the stacked or laminated sheet materials overcomes the resistance of the springs 24, whereupon, the central support plate 13 moves downwardly relative to the side plates 15 and 16 to urge the elongated element 42 against the outer surface of sheet 44.

During the above described manipulation of the movable electrode 12, the generator 38 produces an electrical field between the movable electrode and the table 11 forming a fixed electrode, as indicated by the broken lines 47 and 48. By reason of the dielectric properties of the sheets 44 and 45 and the layer 46 and also of the element 42, the molecules of the dielectric thermoplastic materials are agitated to effect heating and softening thereof. However, it is well known that the intensity of dielectric heating depends upon the distance between the electrodes and that, for a given electrostatic potential, the intensity of dielectric heating achieved with the electrode in contact with the material to be heated is much greater than when the electrodes are spaced from the material to be heated. Thus, since the lower edges of the side plates 15 and 16 which initially contact and compress the lamination of the sheets 44 and 45 and the layer 46 are always closer to the fixed electrode 11 than the bottom edge of the central plate 13 which contacts the elongated element 42, and since the side plates 15 and 16 are pressed against the sheet 44 for a longer period of time than that during which the central plate 13 presses against the elongated element 42, it is apparent that the heating and softening of the laminated sheet materials in the portions 47 of the electrical field will be greater than the heating and softening of the element 42 in the portion 48 of the electrical field. Of course, the heat generated in the parts of the lamination interposed in portions 47 of the field is transmitted to the part of the lamination underlying element 42 so that substantially uniform softening of the lamination is achieved across the width of the electrode 12.

Further, the downward movement of the support plate 13 of the movable electrode is limited, for example, by the adjustable stop bolt 35 and the abutment 34, so that the lower edge 14 of support plate 13 in the lowermost position of the latter does not exert an excessive downward pressure on the elongated element 42. Since the portions of the sheets 44 and 45 and the layer 46 underlying the movable electrode 12 are strongly pressed and relatively intensely heated, such portions of the sheet materials will be permanently compressed and bonded together in the form indicated in FIG. 3, while the element 42 which is only moderately heated and softened and only lightly pressed against the lamination will generally retain its original configuration while being strongly bonded to the softened material of the sheet 44.

Figure 4:
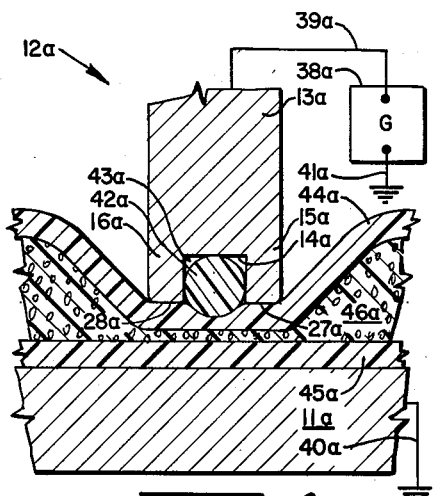
FIG. 4 is a view similar to that of FIG. 3, but showing a movable electrode constructed in one piece in accordance with another embodiment of the invention.

Referring now to FIG. 4 of the drawings, it will be seen that, in another embodiment of the invention, wherein the various parts of the apparatus are generally similar to those described above with reference to the embodiment of FIGS. 1, 2 and 3 and are identified by the same reference numerals, but with the letter "a" appended thereto, it will be seen that the movable electrode 12a includes a plate 13a extending across the table 11a in a vertical plane and having two spaced apart, downwardly projecting, laterally spaced apart flanges or rims 15a and 16a extending along its lower edge in order to define a downwardly opening groove or space 43a extending longitudinally along the center of the lower edge of plate 13a.

As in the first described embodiment of the invention, the elongated, decorative or stitch simulating thermoplastic element 42a is initially extended through the groove 43a while the movable electrode 13a is in an elevated position, and the sheets 44a and 45a and the layer 46a are then disposed on the support table 11a forming a fixed electrode. When the electrode 13a is moved downwardly to the position shown in FIG. 4, the lower edges 27a and 28a of the rims 15a and 16a bear downwardly against the upper surface of sheet 44a to compress the lamination of the sheets 44a and 45a and the layer 46a in the zone encompassed by the width of the movable electrode. At the same time, the generator 38a produces an electrical field between the movable and fixed electrodes. Since the vertical distance from the edges 27a and 28a of the rims 15a and 16a to the upper surface of the table 11a is substantially smaller than the vertical distance from the top 14a of the groove 43a containing the element 42a, and since the heating effected in the electrical field is dependent upon the distance between the electrodes, it is apparent that the sheets 44a and 45a and the layer 46a under the rims 15a and 16a will be more intensely heated than the element 42a under the top surface 14a of groove 43a. Thus, the compressed portions of the sheet materials will be softened to a greater extent than the thermoplastic material of the element 42a which will tend to retain substantially its original shape. In any case, the period during which the movable electrode 12a is retained in its lowered, heating position, is timed in order to avoid excessive softening of the element 42a.

It will be seen that, since excessive heating of the elongated thermoplastic element 42a is to be avoided, in the manner described above, it is essential that such element 42a be formed exclusively of dielectric material. If the thermoplastic material of element 42a included conducting particles, so that electric current could flow therethrough and effect heating as in a resistance wire, then the element 42a would be more intensely heated and correspondingly softened, thereby to prevent retention of substantially the original shape of the element 42a.

Figure 2:
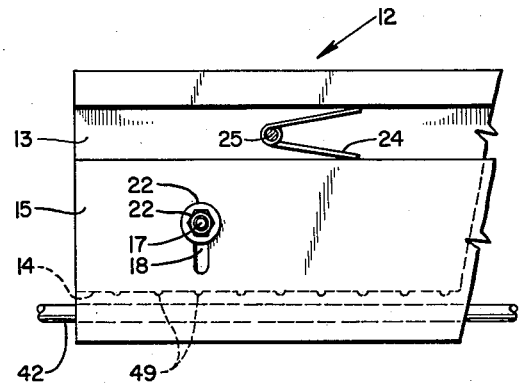
FIG. 2 is a fragmentary side elevational view of a movable electrode assembly included in the apparatus of FIG. 1.
Figure 5:
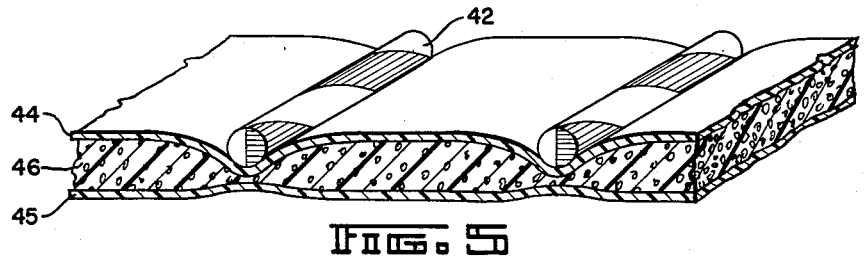
FIG. 5 is a fragmentary perspective view of a plastic sheet material assembly that can be produced with the apparatus embodying this invention.
Figure 6:
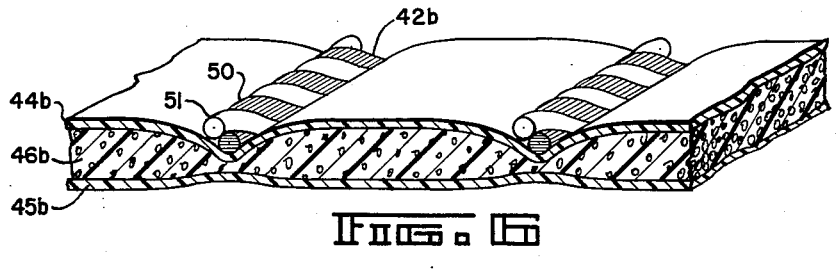
FIG. 6 is a view similar to that of FIG. 5, but showing another form of plastic sheet material assembly that can be produced in accordance with the invention.

The elongated element 42 or 42a bonded to the exposed surface of the sheet 44 or 44a along the area or zone where the sheets 44 and 45 and the padding 46, or the sheets 44a and 45a and the padding 46a, are bonded together may be in the form of a single strand or filament which is entirely of the same color, and, if desired, the lower edge of the central support plate 13 of the movable electrode 12 or the upper surface 14a of the groove 43a of movable electrode 12a may be formed with spaced apart, laterally extending, depending ridges, as indicated at 49 on FIG. 2, adapted to form corresponding indentations in the element 42 so that the latter will simulate the appearance of stitches. On the other hand, the lower edge 14 of the central support plate of electrode 12, or the surface 14a of electrode 12a may be smooth, and, as disclosed in my copending application, Serial No. 551,839, identified more fully above, and as shown in FIG. 5 of this application, the elongated element bonded to the exposed surface of the sheet 44 or 44a may be in the form of a single strand or filament having diametrically opposed portions of contrasting colors and being twisted about its longitudinal axis so that the contrasting colors appear as intertwined helixes to simulate saddle stitching, when one of the contrasting colors is the same as that of the sheet 44, or to simulate chain stitching, when both of the colored portions of the element 42 contrast with the color of sheet 44. Further, as disclosed in my copending application Serial No. 551,839, and as shown in FIG. 6 hereof, the intertwined helical portions of the element 42b bonded to the exposed surface of the sheet assembly 44b, 45b and 46b may be formed by two strands 50 and 51 of contrasting colors which are twisted together to simulate either saddle or chain stitching along each bonding area.

It will be apparent that the assemblies produced in accordance with the present invention are readily adapted for use as an upholstery material, for example, in automobile interiors and the like.

Although the apparatus 10 illustrated in FIG. 1 has only one electrode assembly 12, it is apparent that a plurality of such assemblies may be provided extending parallel to each other, or otherwise, to form any desired pattern on the plastic sheet assembly produced therewith.

Figure 7:
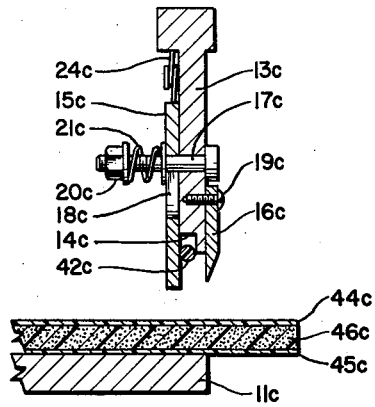
FIG. 7 is a transverse sectional view of still another modification of apparatus embodying this invention.

Further, at least one of the electrode assemblies included in the apparatus embodying this invention may function to both bond together the sheet materials and an elongated element along an edge of the product and to trim the adjacent edge of the product. For example, as shown in FIG. 7, one of the electrode assemblies 12c may include a support plate 13c having a side plate 15c mounted on one side thereof, for example, by a bolt 17c carried by the support plate and extending through a vertically elongated slot 18c in the side plate, and a spring 21c on the bolt 17c between a nut 29c and the side plate 15c to urge the latter against the support plate. As in the previously described electrode assembly 12, the side plate 15c is urged downwardly relative to the support plate 13c, for example, by springs 24c.

In the electrode assembly 12c, a cutter blade 16c is secured, as by screws 19c, to the side of the support plate 13c facing away from the side plate 15c and replaces the side plate 16 of assembly 12 so that, when the electrode assembly is moved downwardly toward the table 11c, for example, in the manner described in connection with FIG. 1, the side plate 15c initially contacts the top sheet 44c and compresses the sheets 44c, 45c and 46c to heat and bond together such sheets and, thereafter, the blade 16c cooperates with the adjacent edge of the table 11c to shear or trim the bonded together sheets while the lower edge 14c of the support plate 13c holds an elongated element 42c against the previously softened bonding area of the sheet 44c for bonding to the latter. It will be apparent that, in the case of the electrode assembly 12c, as well as in all other embodiments of this invention, the downward movement of the support plate 13c is limited to prevent the application of excessive pressure thereby against the elongated decorative or stitch simulating element 42c.

Among the dielectric, thermoplastic materials suitable for the sheets 44 and 45 are the vinyl polymers and copolymers, such as, for example, polyvinyl chloride, polyvinylidene chloride, polyvinyl chloride-vinyl acetate, copolymers, vinylchloride-vinylidene chloride copolymers, mixtures of the foregoing, copolymers of vinyl chloride or other vinyl halides with monomers such as vinyl acetate, vinylidene diethyl maleate and vinyl-acetals such as vinyl butyral chloride in which the vinyl chloride component of the resinous copolymer usually is about 85 to 95 percent by weight, the foregoing copolymers formed with relatively small amounts, for example, from 1 to 5 percent, by weight, of another polymerizable material such as maleic acid, polyvinyl alcohol and polystyrene; plasticized cellulose derivatives, such as, celluloid; acrylics; polyethylene; polyamide; rubber hydrochloride; and hydrocarbon resins, such as, polyisobutylene.

Suitable plasticizers for the above mentioned class of vinyl resins are monomeric plasticizers of which high boiling esters, ketones, and ethers are preferred such as dioctylphthalate, dioctyl sebacate, dibutyl phthalate, tricresyl phosphate and hydrofurfural esters, ethers, and ketones. Other suitable plasticizers are adipates, acetates, benzoates, citrates, oleates, phosphates, phthalates, ricinoleates, sebacates, stearates, epoxides, and hydrocarbons.

Some of the plasticizer may be of the polymeric type. Some examples are long chain linear polyesters of which polyesters of an alkylene glycol and a dicarboxylic acid such as polyethylene-propylene glycol sebacate and Paraplex G-60 (a high molecular weight alkyd resin) are suitable. Another suitable long chain polyester is Paraplex G-25 (polypropylene ether glycol-sebacate) which is sold by Resinous Products and Chemical Corp. and is a soft viscous alkyd resin having a specific gravity of 1.06 and an acid number of not more than 2.0; also, it is soluble in esters, ketones, aromatic and chlorinated hydrocarbons. Polymeric plasticizers such as those which are copolymers of a conjugated diolefin having less than 7 carbon atoms, such as butadiene, and a copolymerizable monomer such as acrylonitrile or methyl isopropenyl ketone may also be present.

Other compounding ingredients may be used in the polyvinyl base compositions, such as additives and fillers which are well known in the art, for example, heat and light stabilizers, waxes, flame retardants, bodying agents, accelerators, lubricants, colors and volatile solvents, provided that such additives or fillers do not detract from the necessary dielectric properties of the material.

The monofilament or thread forming the elongated element 42 is preferably made of polyvinyl chloride or polyvinylidene chloride composition similar to that of the sheets 44 and 45, or of any of the other plastic materials described above as being suitable for the sheets 44 and 45 provided that the elongated element is both thermoplastic and dielectric, and bondable to the plastic material of the sheets 44 and 45. The plastic threads or elongated elements should be of a material that is easily welded to the sheet material when the diameter of the threads is in the range of 1 to 4 times the thickness of the sheet material. Although it is preferred that the threads or elongated elements 42 be formed all of plastic material, plastic coated fibers of cotton, rayon, nylon or the like may be used so long as the thread or elongated element is dielectric.

The thermoplastic materials mentioned above as being usable for the sheets 44 and 45 may be foamed for use for the layer or padding 46.

Although illustrative embodiments of the invention have been described in detail herein with reference to the accompanying drawings, it is to be noted that the invention is not limited to such precise embodiments, and that various changes and modifications may be effected therein without departing from the scope or spirit of the invention, except as defined in the appended claims.

What is claimed is:

1. The method of decorating an exposed surface of a sheet of thermoplastic dielectric material, comprising the steps of holding an elongated decorative element of exclusively dielectric thermoplastic material against said exposed surface of the sheet while the zone of said sheet along which said element extends is interposed in a high frequency dielectric heating field having greater heating power at the opposite sides of said element than at the location of the latter to soften said zone of the sheet and said decorative element to a greater and lesser extent, respectively, and thereby cause bonding of said element to the sheet while avoiding mutilation of said element.

2. The method of producing a laminated assembly having at least two sheets of thermoplastic material comprising the steps of extending an elongated decorative thermoplastic element along the center of an elongated zone on an exposed surface of one of said sheets at which the latter are to be bonded together, strongly pressing together and heating said sheets at the opposite marginal portions of said zone in order to soften the thermoplastic material in said zone, and holding said element against said softened zone while heating said element to a lesser extent than said sheets to effect bonding of said element to said exposed surface simultaneously with the bonding together of said sheets at said zone and to avoid mutilation of said element during said bonding thereof to said exposed surface.

3. In apparatus for bonding upper and lower elements of thermoplastic sheet material along a predetermined elongated bonding area and for bonding an additional elongated element to an outer surface of the upper one of said sheet elements along said area; an electrode assembly which comprises, in combination, a pair of parallel, spaced presser plates having edges adapted for engagement with the outer surface of the upper sheet element along lateral side portions of said area, means for retaining said presser plates in parallel spaced relation, a central electrode plate nested between said presser plates and slidable relative thereto and having an edge adapted for engagement with the elongated element lying along the mid portion of said area, means for resiliently urging said presser plates into a displaced position with respect to said electrode plate so that said edges of the presser plates will project beyond said edge of the central electrode plate, and means for moving said assembly towards said upper sheet element so that said edges of the presser plates are first applied against said lateral side portions of said area to soften and bond together the upper and lower elements of sheet material at said area and said edge of the central electrode is thereafter applied against the elongated element at said mid portion of said area and merely holds the elongated element against the previously softened material of the upper sheet element to cause bonding of the elongated element to the latter.

4. In a bonding apparatus of the kind described, an assembly comprising a pair of parallel, spaced side bonding plates having active edges adapted for engagement with parallel spaced marginal portions of a bonding area, an intermediate bonding plate slidably mounted between said side plates for predetermined movement relative to the latter, resilient means for urging said side plates in one direction relative to said intermediate plate so that the edges of said side plates are moved to a projected condition beyond said intermediate plate edge toward the bonding area, means for feeding an elongated element through the space defined between said side plates, said intermediate plate and the bonding area, and means for applying said assembly against the bonding area so that said side plates are pressed against the marginal portions of the bonding area to soften the latter and, thereafter the intermediate plate holds the elongated element against the softened bonding area to bond said element to said area.

5. In a bonding assembly of the kind described, the combination of a first bonding plate having an active edge adapted for engagement with one linear portion of a bonding area, a second bonding plate slidably mounted with respect to said first plate at one side of the latter, resilient means tending to hold said plates in a relative position in which said first plate edge projects beyond the edge of said second plate towards the bonding area, means for feeding an elongated, flexible element to be bonded along a path extending adjacent said first plate edge between said second plate edge and the bonding area, and means for moving said assembly towards the bonding area so that said first plate edge initially presses against the latter and for then overcoming said resilient means so as to apply said second plate edge to the elongated element for holding the latter against the bonding area.

6. In a bonding assembly, the combination as in claim 5, further comprising a cutter member secured to said second plate at the side of the latter away from said first plate and having a cutting edge projecting beyond said second plate edge but short of said first plate edge in the projected condition thereof.

7. In a bonding assembly, the combination as in claim 5, wherein said second plate edge has projections formed therealong for forming indentations in said elongated element.

8. In a bonding assembly of the kind described, the combination of two parallel spaced apart side bonding plates having active edges adapted for engagement with spaced linear portions of a bonding area, a central bonding plate slidably mounted with respect to said side plates, the edge of said central plate being normally retracted between said side plates, means for feeding a length of bondable strip-like material in between said side plates and adjacent said central plate edge, and means for first moving said assembly bodily until said side plate edges have engaged the spaced portions of the bonding area to soften the latter and for then advancing said central plate until its edge has applied the length of bondable strip-like material to the mid portion of the softened bonding area.

9. In a bonding assembly of the kind described, the combination of a first bonding plate having an active edge adapted for engagement with one linear portion of a bonding area, a second bonding plate slidably mounted with respect to said first plate at one side of the latter and having an edge adapted for engagement with another and adjacent linear portion of the bonding area, said second plate edge being normally retracted short of said first plate edge, means for feeding a length of bondable material alongside said first plate edge between said second plate edge and said other linear portion of the bonding area, and means for first moving said assembly bodily toward the bonding area until said first plate edge has engaged said first portion to soften the bonding area and for then advancing said second plate relative to said first plate until said second plate edge has applied said length of material against said second portion of the softened bonding area to bond said length to the area.

10. In apparatus for bonding an elongated element to at least one sheet of thermoplastic material; an electrode assembly including a support plate arranged in a plane normal to the sheet material and movable in said plane toward and away from the sheet material, a side plate disposed at least at one side of said support plate and mounted on the latter for movement with respect to the support plate in the directions toward and away from the sheet material, and means resiliently urging said side plate relative to said support plate to a displaced position wherein an edge of said side plate projects beyond the adjacent edge of said support plate in the direction toward the sheet material; means for moving said electrode assembly towards the sheet material so that said edge of the side plate is first applied against the sheet material along a margin of a bonding area to soften the latter and, thereafter, said means resiliently urging the side plate to said displaced position is overcome to permit movement of said support plate relative to said side plate in the direction toward the sheet material; and means limiting the movement of said support plate in the direction toward the sheet material so that said edge of the support plate merely holds an elongated element extending alongside said side plate against the previously softened bonding area to cause bonding of the elongated element to the sheet material.

11. In apparatus for bonding together a plurality of sheets of thermoplastic material along at least one elongated bonding area and for bonding an additional elongated element to the outer surface of one of the sheets along each bonding area; the combination of a horizontal table for supporting the sheets of thermoplastic material with said one sheet uppermost; an electrode assembly for each bonding area including a vertically movable support plate disposed above said table with its lower edge parallel to the latter, a side plate disposed at least at one side of said support plate and mounted on the latter for vertical movement with respect to the support plate, and resilient means urging each side plate to a displaced position relative to said support plate wherein the lower edge of said side plate projects a substantial distance downwardly beyond said lower edge of the support plate; means for displacing said support plate vertically downward so that said lower edge of the side plate is first applied against the uppermost sheet of thermoplastic material along a lateral margin of the related bonding area to soften and bond together the plurality of sheets at said area, and, thereafter, said resilient means is overcome to permit downward movement of said support plate relative to said side plate for applying said lower edge against an elongated element disposed on the bonding area alongside said side plate; and means limiting the downward movement of said support plate relative to said table at a position where said lower edge of the support plate merely holds the elongated element against the previously softened material of the uppermost sheet to cause bonding of the elongated element to the latter.

12. In an apparatus for bonding together a plurality of sheets of thermoplastic material along at least one elongated bonding area and for bonding an additional elongated element to the outer surface of one of the sheets along each bonding area; the combination as in claim 11, wherein said electrode assembly has a side plate at each of the opposite sides of said support plate for guiding the elongated element between the downwardly projecting lower edge portions of the side plates.

13. In apparatus for bonding together a plurality of sheets of thermoplastic material along at least one elongated bonding area and for bonding an additional elongated element to the outer surface of one of the sheets along each bonding area; the combination as in claim 11, wherein said electrode assembly has only one side plate and further includes a cutting blade fixed to the side of said support plate opposed to said side plate, said blade having a lower cutting edge projecting below said lower edge of the support plate and operative, when the latter is moved downwardly, to trim the sheets along the related bonding area.

14. The method of bonding an elongated decorative element of thermoplastic dielectric material to at least one sheet of thermoplastic dielectric material, comprising placing the sheet on a horizontal table, extending the decorative element along a groove formed in an edge of a movable electrode and having a width at least as large as the width of the decorative element, displacing the movable electrode toward the table until the edge thereof, at the opposite sides of the groove, presses the sheet along zones at the opposite sides of said decorative element while the latter is held against the sheet, and impressing a high frequency alternating potential across said table and said movable electrode to establish a dielectric heating field therebetween which has a greater heating power at said zones at the opposite sides of the decorative element than at the latter so that said zones are softened to a greater extent than said decorative element and the latter is bonded to the sheet without being substantially deformed.

References Cited in the file of this patent

UNITED STATES PATENTS

| | | |
|---|---|---|
| 2,399,744 | Kaphan | May 7, 1946 |
| 2,494,905 | Shumann | Jan. 17, 1950 |
| 2,625,201 | Smith | Jan. 13, 1953 |
| 2,631,646 | Gannon et al. | Mar. 17, 1953 |
| 2,638,963 | Frederick | May 19, 1953 |
| 2,710,046 | Markus | June 7, 1955 |
| 2,804,419 | De Woskin | Aug. 27, 1957 |